Feb. 25, 1969 U. MERTEN 3,429,957
PROCESS FOR CONTINUOUSLY CASTING A SEMI-PERMEABLE MEMBRANE
Filed July 6, 1965
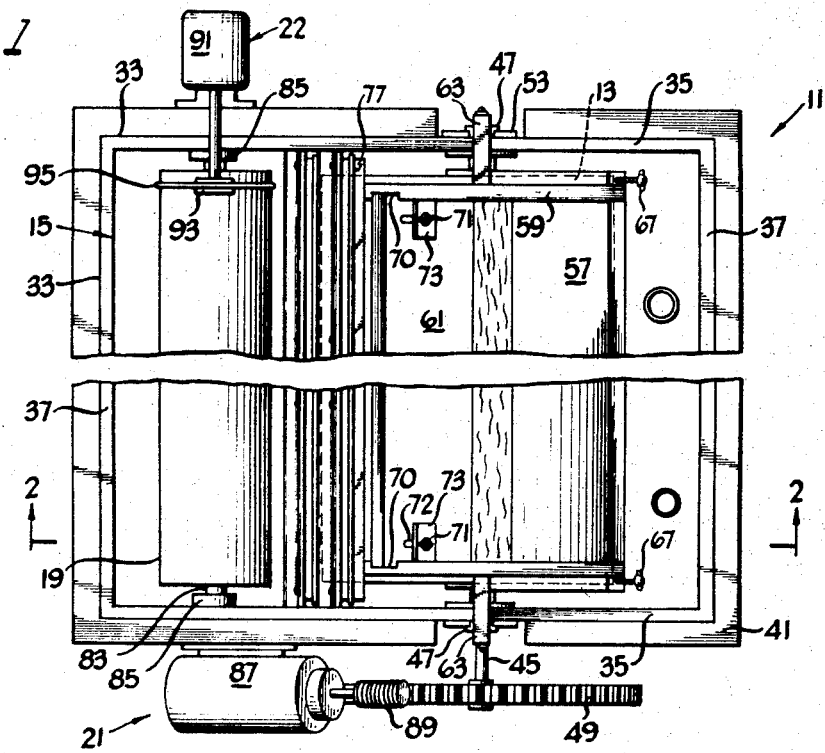
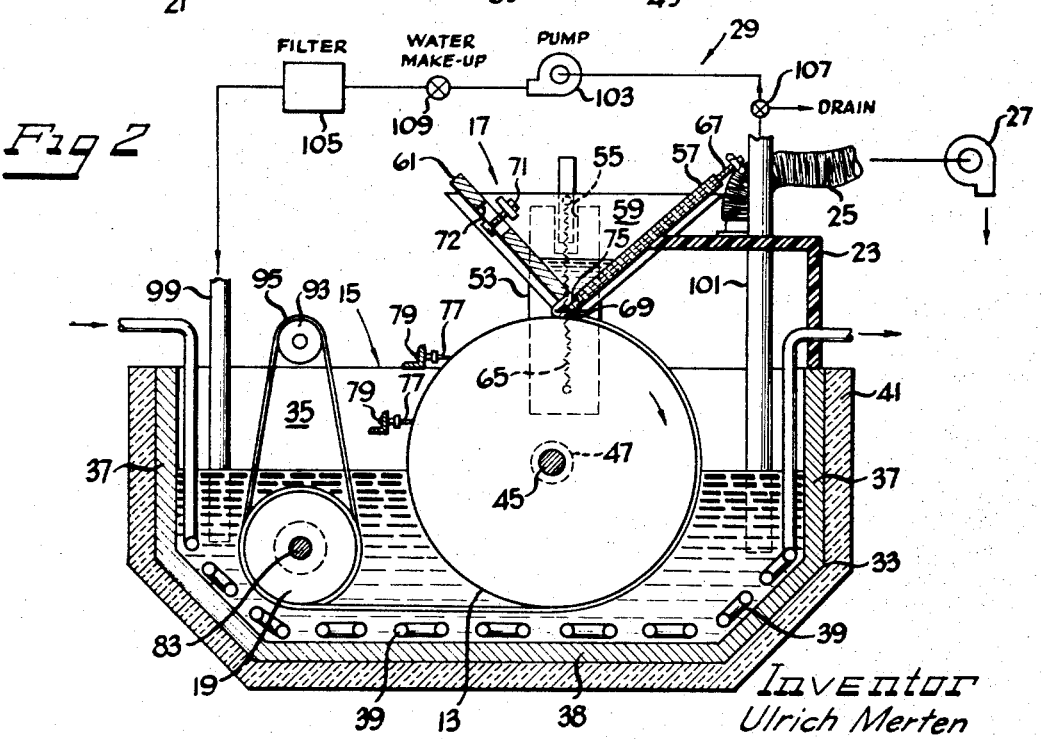
Inventor
Ulrich Merten
By Anderson, Luedeka, Fitch, Even & Tabin
Atty's United States Patent Office 3,429,957
Patented Feb. 25, 1969

3,429,957
PROCESS FOR CONTINUOUSLY CASTING A SEMI-PERMEABLE MEMBRANE
Ulrich Merten, Solana Beach, Calif., assignor, by mesne assignments, to Gulf General Atomic Incorporated, San Diego, Calif., a corporation of Delaware
Filed July 6, 1965, Ser. No. 469,619
U.S. Cl. 264—49                    4 Claims
Int. Cl. B29d 7/20, 27/04

This invention resulted from work done under a contract with the Office of Saline Water in the Department of the Interior, entered into pursuant the Saline Water Act, 42 U.S.C. 1951–1958g.

This invention relates to semipermeable membranes and more particularly to a process for continuously casting a semipermeable membrane from a fluid casting solution.

Semipermeable membranes, which permit the passage therethrough of a solvent, while rejecting a solute, when a solution at at least a certain minimum pressure is applied to the membrane, can be cast from fluid casting solutions, such as cellulosic ester solutions. Such semipermeable membranes are sometimes hereinafter referred to as nonuniform membranes because one surface has extremely different characteristics than the other surface. This one surface is sometimes termed the active surface layer, often only about 0.2 micron in thickness, and is believed to account for the osmotic properties of the membrane. The process by which some such semipermeable membranes operate is often referred to as reverse osmosis. One example of a nonuniform semipermeable membrane of this type is more particularly described in United States Patent No. 3,133,132 to Loeb et al.

In the general process described in this patent, a casting solution is prepared by dissolving a film-forming cellulosic ester, such as cellulose acetate, plus an aqueous solution of a pore-producing salt, in an organic solvent. This casting solution is cooled to a temperature about −7.5° to −16° C., and a plate is cooled to about the same temperature. A thin film of the solution is then cast between runners on the plate, and the thickness of the cast film is held to a uniform dimension by dragging a doctor blade across the runners. Evaporation of the organic solvent is permitted for a predetermined time period. After this time, the plate and cast film are immersed in water at a temperature slightly above the freezing point.

The above-described casting process is inherently a batch-type operation and suffers the disadvantages of any batch-type operation. More economical processes for manufacturing membranes of this type are desired. In addition, in a batch operation of this type, there is an inherent difference in the time when the leading end of the film is laid down and when the trailing end of the film is laid down, especially if a membrane of a substantial length is cast. This difference in time results in a difference in the total time for which portions of the film are exposed to evaporation and may result in a slight difference in the resultant characteristics of the membrane. A process and apparatus for eliminating any such time differences are desired.

It is an object of the present invention to provide an improved process for casting semipermeable membranes. It is another object to provide a process for casting a continuous semipermeable membrane from a fluid casting solution. It is a further object to provide a process for producing thin semipermeable membranes from cellulosic ester solutions in such a manner that the chemical and physical properties of the cast membranes are precisely reproducible. It is a still further object to provide improved apparatus for economically casting thin nonuniform semipermeable membranes. These and other objects of the invention are more particularly set forth in the following detailed description and in the accompanying drawings wherein:

FIGURE 1 is a plan view of apparatus for casting continuous lengths of semipermeable membranes which apparatus embodies various features of the present invention; and FIGURE 2 is a sectional view taken generally along lines 2—2 of FIGURE 1, with certain diagrammatic additions.

It has been found that a continuous length of a semipermeable membrane can be produced by continuously casting a thin film of a fluid casting solution on a moving endless flat surface. The cast film is exposed for a predetermined short period of time to an atmosphere which allows limited evaporation of a solvent component of the casting solution to occur, the exposure aiding in the initial organization of the active surface layer of the nonuniform membrane, and the cast film is then brought in contact with a liquid to complete the organization of the semipermeable membrane. Apparatus for economically performing this process includes the provision of a moving endless flat surface, such as a rotating cylinder, which is driven at a timed rate of linear surface travel, and which is disposed so that a thin film of a fluid casting solution may be cast upon the upper surface. The rate of travel of the endless surface exposes the cast film to the atmosphere adjacent thereto for a predetermined period, and then enters a region wherein the cast film comes in contact with a liquid which completes the organization of the membrane. The apparatus also includes means for removing the completed membrane from the moving endless surface before it reaches the location where casting takes place.

The invention, for ease of description, is hereinafter referred to with reference to a process for casting a semipermeable membrane from a cellulosic ester solution. However, it should be understood that the method and apparatus disclosed herein may be employed in making other similar types of semipermeable membranes.

A continuous casting apparatus 11 is illustrated in FIGURES 1 and 2 of the drawings. The apparatus 11 generally comprises a cylindrical drum 13 which provides a smooth flat casting surface, which drum is rotatably mounted within a reservoir 15. A generally V-shaped casting trough 17 is adjustably mounted directly above the top of the rotatable drum 13 and serves to apply a thin film of a casting solution to the rotating underlying drum 13. A take-up drum 19 is laterally spaced from the rotatable casting drum 13 and serves as the take-up reel for the continuous length of cast membrane.

Drive means 21 and 22 are provided for rotating the drums 13 and 19, respectively, in timed relation to each other. A hood 23 overlies the portion of the reservoir 15 and the casting drum 13 toward which the drum rotates after passing the location where the film is applied thereto. The hood 23 contains an exhaust conduit 25 which leads to an exhaust blower 27 which assures sufficient circulation of air passes over the cast film, immediately after it is cast upon the drum 13, to promote the desired limited evaporation of the organic solvent from a film cast from a cellulosic ester casting solution which provides the desired non-uniform properties. A water circulation system 29 assures that the reservoir 15 is kept filled with water, preferably distilled water although tap water may be used, to the desired level, usually up to a vertical level at about the middle of the drum 13, and that there is a sufficient change of the water in the reservoir 15 so that no undesirably high concentrations of substances build up therein.

More specifically, the reservoir 15 includes an open-top tank 33 made of stainless steel or any other suitable material, and formed of liquidtight construction. The tank 33 includes a pair of vertical sidewalls 35 interconnected by end walls 37 and a bottom 38. In the illustrated configuration of the tank 33, the horizontal cross sectional area of the tank decreases slightly near the bottom thereof. To suitably regulate the temperature of the water within the tank 33, a cooling system is provided which includes a cooling coil 39 which lies adjacent the inner surface of the end walls 37 and bottom 38 of the tank and is connected to a cooling regulator (not shown) which circulates a suitable coolant therethrough. The outer surface of the tank 33 is covered with a suitable insulation 41, such as foamed polystyrene.

The casting drum 13 is mounted on a horizontal shaft 45 which extends through the sidewalls 35 of the tank 33 and is supported in a pair of bearings 47 which are attached to the outer surfaces of the sidewalls 35 of the tank 33. Shaft seals are provided to prevent water from entering the bearing housings. At one end, the shaft 45 extends through the bearing housing; on this extension of the shaft 45, there is mounted a gear 49 which is driven to cause the desired timed rotation of the casting drum 13. The drive means 21, which includes the gear 49, is described hereinafter.

The V-shaped casting trough 17, which is mounted vertically above the casting drum 13, is supported by a pair of upright standards 53 which are bolted to the outer surfaces of the sidewalls 35 of the tank 33. Each of the standards 53 includes a vertical slot 55, open at its top, wherein the trough 17 is restrained against lateral movement while vertical movement of the trough is permitted. The casting trough 17 comprises a forward wall 57 and a pair of parallel triangular shaped sidewalls 59 which are fixedly attached to the rear surface of the forward wall 57 at locations inward of the lateral ends of the forward wall. The term forward, as used herein, refers to the position of the wall of the trough 17 relative to the direction of rotation of the casting drum 13, clockwise as shown in FIGURE 2. The open-top casting trough 17 is completed by an adjustable rear wall 61.

The trough 17 is supported above the casting drum 13 by a pair of laterally extending support arms 63, mounted to the outer surfaces of the triangular sidewalls 59, which arms are proportioned to laterally fill the vertical slots 55 and thus stably support the trough 17 therein. The weight of the trough 17 plus a pair of coil springs 65 retain the support arms 63 within the slots 55. The ends of each spring 65 are respectively attached to a point at the end of one of the support arms 63 and to a fixed point below on the outer surface of one of the standards 53.

In the illustrated arrangement, the lower surface of the fixed forward wall 57 of the trough would be apt to ride on the surface of the casting drum 13 if some other provision were not made. To adjustably space the forward wall above the casting drum surface, a pair of thumbscrews 67 are threadably mounted in suitable tapped holes which extend through the front wall 57 at positions laterally outward of the triangular sidewalls 59. The lower ends of the thumbscrews 67 have tips 69 which are coated with a material, such as Teflon, which has low friction characteristics. When the tips of thumbscrews 67 extend from the bottom edge of the forward wall 57, the tips ride on the upper surface of the casting drum 13 and accordingly space the bottom of the forward wall of the trough 17 an adjustable distance thereabove. Adjustment of the thumbscrews 67 accordingly changes this spacing which regulates the thickness of the film being cast.

The adjustable rear wall 61 is supported in any suitable manner so that its bottom edge can be easily moved toward and away from the rear surface of the front wall 57 to thereby adjust the distance therebetween in order to regulate the flow of the casting solution from the trough 17 onto the rotating drum 13. In the illustrated embodiment, a pair of slotted guideways 70 are milled out of the inner surfaces of the triangular sidewalls 59. The lateral edges of the rear wall 61 reside in these guideways 70. The edges of the rear walls 61 may be provided with suitable seals, if desired, to prevent undesired leakage of the casting solution out of the trough 17 through these guideways 70.

To secure the slideable rear wall 61 in the desired relative position, a pair of clamping screws 71 are provided which pass through slots 72 provided in the rear wall at a location above the normal level of casting solution in the trough 17. The clamping screws 71 reside in tapped holes in brackets 73 affixed to the inner surfaces of the triangular sidewalls 59. By tightening the clamping screws 71, the rear wall 61 is clamped at any desired position in the guideways 70. So that the casting trough 17 may be completely closed off when it is desired for some reason to discontinue the casting operation, a groove 75 is milled in the rear surface of the forward wall 57 which groove is proportioned to receive and seat the lower edge of the adjustable rear wall 61 and thus completely close the gap through which the downward flow of the casting solution takes place.

The casting drum should be substantially dry when it passes under the casting trough 17 so that streaks or droplets of water do not interfere with the production of a thin membrane of uniform thickness. Because the drum 13 rotates through the water bath in the tank 33, a pair of flexible squeegees or wipers 77 are mounted in contact with the surface of the rotating drum 13 and serve to remove any moisture droplets therefrom. These squeegees 77 may be generally similar to the type used with ordinary automobile windshield wipers. The squeegees 77 are held in position by suitable mounting brackets 79 which extend between the opposite sidewalls 35 of the tank 33.

The take-up drum 19 is mounted on a horizontal shaft 83 which rotates in a pair of bearings 85 suitably affixed to the inner surfaces of the tank sidewalls 35. The drum 19 is mounted such that the lowermost point on its surface is at the same general vertical level as that of the lowermost point on the surface of the casting drum 13. The horizontal shaft 83 is parallel to the horizontal shaft 45 on which the casting drum 13 rotates. The size of the take-up drum 19 is such that the entire drum is normally below the water surface level which is maintained in the reservoir 15.

Although the drive means 21 and 22 for both drums are separate, motors are employed which can be easily adjusted so that the surfaces of the drums have approximately the same linear speed. Drive means 21 includes an electric motor 87 mounted on the outer surface of the tank sidewall 35 which motor drives the gear 49 fixedly mounted on the casting drum shaft 45. A worm gear 89 is affixed to the output shaft of the electric motor 87 and is in continuous driving engagement with helical teeth on the gear 49. Drive means 22 includes an electric motor 91 mounted on a tank sidewall 35. Affixed to the output shaft of the motor 91 is a pulley 93 which is connected via a suitable drive belt 95 to the take-up drum 19. A shallow groove cut in the surface of the take-up drum 19 assures that the belt 95 remains in the proper position. The tension on the belt 95 is adjustable by vertically moving the motor 91 so that some slippage is permitted between the belt 95 and the surface of the take-up drum 19. In operation, after the electric motor 87 is adjusted to drive the casting drum 13 at the desired speed, the electric motor 91 is adjusted to turn the take-up drum 19 at a slightly faster linear surface speed so that the membrane being wound upon the take-up drum 19 is kept in a state of slight tension during take-up. However, the permitted slippage between the belt 95 and the surface of the drum 19 is sufficient to prevent tearing of the membrane.

The water circulation system 29 includes an inlet pipe 99, an outlet pipe 101, and a small centrifugal pump 103 for circulating the water through the reservoir 15. A filter 105 is provided in the line between the pump 103 and the inlet pipe 99 to remove any undesirable material which may be carried along in the water stream. Because the distilled water which is employed will dissolve certain soluble substances from the casting solution, continuous discharge and replenishment of a fraction of the water is carried out. A drain valve 107 discharges a preselected proportion of the water drawn through the outlet pipe 101. A valve 109 disposed in the line between the pump 103 and the filter 105 provides for the addition to the stream of a metered amount of pre-cooled distilled water which is equal to the amount discharged at the drain valve 107. Accordingly, the water circulation system 29 operates to maintain the surface level of water in the reservoir 15 at the desired predetermined level, usually at a vertical height about equal to the height of the casting drum axis.

In operation of the apparatus 11, a suitable casting solution is prepared and manually poured into the open top of the V-shaped casting trough 17. Although in the illustrated apparatus it contemplates manual supply of the casting solution, it is obvious that apparatus may be included for continuously supplying a metered flow of casting solution to the trough 17. Before the casting solution is added, the rear wall 61 of the trough is adjusted to seat its lower edge in the groove 75 and thereby closes the bottom of the trough 17. Any suitable casting solution may be employed from which a semipermeable membrane can be cast.

As stated above, a semipermeable cellulose acetate membrane may be produced from a casting solution of cellulose acetate plus an aqueous solution of a swelling agent, such as magnesium perchlorate or zinc chloride, both of which have been dissolved in an organic solvent. One example of a suitable casting solution comprises the materials listed below in the corresponding weight percents:

| | Percent |
|---|---|
| Acetone | 66.7 |
| Cellulose acetate | 22.2 |
| Water | 10.0 |
| $Mg(ClO_4)_2$ | 1.1 |

The cellulose acetate is in the form of approximately the 2.5-acetate, one commercially available suitable resin being Eastman E–398–3.

To facilitate the creation of a homogeneous solution, the magnesium perchlorate is preferably first dissolved in the water and then mixed with the acetone. To this solution, the cellulose acetate is added portion by portion, because it is fairly difficult to dissolve. Usually about a quarter of the total cellulose acetate is added at a time, and the solution is shaken vigorously, as on a mechanical shaker, to complete dissolution. After all of the cellulose acetate has been added, the total solution is shaken for about two hours and is then placed in a suitable container and rolled for about a day to assure that homogeneity is achieved. Subsequently, the solution is permitted to stand for about two hours to permit any entrapped air to escape. Finally, it is cooled to a temperature of about −8° C., at which time it is ready for use in the casting process.

In one example of a suitable apparatus 11, a casting drum 13 having a smooth cylindrical surface made of stainless steel of a diameter of 12 inches is employed. The casting drum 13 is driven at about ¼ revolution a minute, which is equal to a linear surface speed of about 45 feet per hour. The water level in the reservoir 15 is held at the level of the horizontal axis of the casting drum so that the bottom half of the surface of the drum is immersed in the water. A take-up drum 19 having a cylindrical surface, made of polyvinyl chloride, about 2½ inches in outer diameter is spaced as illustrated in FIGURE 2, completely immersed in the reservoir 15. The take-up drum 19 is driven so that its surface has a slightly higher linear speed than that of the casting drum 13 to keep the membrane in tension during take-up. The belt 95 slips sufficiently in the groove on the surface of the take-up drum 19 to prevent the membrane from tearing.

The tank 33 is filled to the desired level with distilled water, and the pump 103 and valves 107 and 109 are regulated to maintain a constant water level. Sufficient flow of a refrigerant, such as Freon-12, is maintained through the cooling coils 39 to keep the temperature of the distilled water reservoir 15 at about 1° C. At the same time, sufficient circulation of distilled water is maintained during the casting operation so that any solids which might become entrained in the water are removed by the filter 105 and so that there is good flow of water past the membrane film which sets-up on the surface of the casting drum 13. The distilled water in the reservoir 15 dissolves the swelling agent and any of the solvent which still remains in the film when it is immersed, thereby removing these substances from the membrane film. To assure complete removal is effected, adequate circulation of the water in the reservoir 15 is maintained. For a reservoir which contains about 38 liters of water, it is believed that the input and output of water to and from the tank 33 should be between about 500 and 1000 cc. per minute.

To avoid any significant build-up of the swelling agent or the organic solvent in the reservoir 15, a constant interchange of water is effected. Usually, the drain valve 107 is set so that about 10 percent of the outlet flow of liquid from the tank 33 is discharged to the drain. Accordingly, a like amount of water is returned to the circulation system 29 to the make-up valve 109. The make-up distilled water is pre-cooled to a temperature of about 1° C. before it is fed into the circulation system 29.

As a preparation for casting operation, the drive means 21 is activated to drive the casting drum 13 at about a quarter revolution per minute and to drive the take-up drum 19 at a slightly faster linear surface speed. Under these conditions, the upper surface of the cast film is exposed to the moving current of air for about a minute to allow limited solvent evaporation, the exposure accomplishing initial organization of the upper film surface which provides nonuniform properties in the resultant membrane. Although exposure for about a minute to a moving current of air is considered preferable, exposure to any suitable nonreactive gas for between about 30 seconds and about 5 minutes may be used. Use of a moving current of gas is preferred to regulate the evaporation and thus facilitate the uniformity of rejection capability of the membrane throughout an entire production run. The thumbscrews 67 are adjusted so that the bottom edge of the forward wall 57 of the trough 17 is set about 0.013 inch above the surface of the casting drum 13. The blower 27 is activated and draws about 10 cubic feet of air per minute through the hood 23.

The trough 17 is filled to the desired level with the pre-cooled casting solution, and the operation is ready to begin. Although the casting solution is preferably pre-cooled to about −8° C. it may be employed at temperatures between about 0° C. and about −20° C. By loosening the clamping screws 71, the adjustable rear wall 61 is moved out of the groove 75 to provide a gap of about 0.5 inch at the bottom of the trough 17.

Downward flow of the casting solution begins, and a thin coating of the casting solution is supplied uniformly across the major portion of the surface of the stainless steel casting drum 13. When the surface of the drum 13 passes below the trough 17, it is relatively dry as a result of the pair of squeegees 77 which remove any residual water droplets therefrom. The temperature of the drum surface approximates that of the reservoir 15, i.e. about 1° C.

The cast solution is exposed to the flow of air under the hood 23 for about one minute from the time it is cast until it becomes immersed in the distilled water reservoir 15. Immersion in water at about 1° C. temperature completes the set-up of the nonuniform membrane and removes the remaining organic solvent and the swelling agent. The set-up membrane is easily removed from the casting drum 13. Usually the first membrane produced is collected for about ten minutes, which is considered sufficient time to achieve uniformity of operation. This initial length of membrane is severed and discarded, and the sheet of membrane then being produced is wound on the take-up drum 19.

The distance between the triangular sidewalls 59 of the casting trough 17 is slightly greater than 12 inches and accordingly a continuous length of membrane having this width is produced because the relatively high viscosity of the film inhibits any substantial sideward flow on the drum 13. The take-up drum 19 is allowed to accumulate about two hours worth of membrane, equal to a useable area of about 90 square feet. At the end of this time, the membrane is cut, the filled drum 19 removed, and a new drum 19 is inserted.

To assure that the membrane is completely free of solvent, swelling agent, and other possible impurities, it is preferably transferred to a bath of circulating water at ambient temperature and rolled upon another spool. The washed membrane is examined and shows that it has a useful width of about 12 inches and a uniform thickness of about 100 microns.

A portion of the roll of semipermeable membrane having these nonuniform physical properties is tested to determine its solute rejection capability. The side of the membrane which was exposed to the moving current of air during the casting process is exposed to a salt solution, and the other side of the membrane is supported on a 20 micron porous sintered stainless steel plate. There is maintained a solution pressure of about 800 p.s.i. of an aqueous 1 percent solution of sodium chloride, percent by weight of total solution. The output liquid which passes through the nonuniform membrane is collected, measured, and tested. Examination of the output liquid shows that about 56 percent of the sodium chloride is rejected by the membrane.

A second sample of the same size is taken from a different place along the roll of nonuniform membrane, a substantial distance from the location of the first sample, and tested in the same manner. The results of this test show that about 54 percent of the sodium chloride is rejected. Correspondence between the results of these two tests to within two percent of each other illustrates the uniformity of the rejection capability of the membrane produced by this casting process.

Measurement of the amount of output liquid collected, the effective surface area of the membrane, the pressure of the sodium chloride solution applied, and the total time for which product was collected allows a parameter which is referred to as the "membrane constant," to be calculated. Measurement shows that the respective membrane constants of the first and second samples measure about $3.5$ times $10^{-5}$ grams/cm.$^2$-sec.-atm. and about $4.3$ times $10^{-5}$ grams/cm.$^2$-sec.-atm. Correspondence within this range is considered to indicate acceptable uniformity in rejection capability. The membrane having these nonuniform physical properties is considered well-suited for separation operations wherein a high flux is desired and a fairly low solute rejection rate is acceptable.

In order to alter the rejection characteristic of the membrane and adapt it for a high percentage of solute rejection, although at the same time accepting a decrease in the flux, as indicated by the membrane constant, the membrane is heat-treated. The entire roll of membrane is placed in a water bath which is maintained at a temperature of about 80° C. and it is held in the bath for about 30 minutes. At the end of this time, the heat-treat-treatment is complete, and the membrane is ready to use.

Six different samples from different locations along the roll of membrane are tested in the manner set forth above. These six samples respectively reject 96.5%, 96.5%, 97.1%, 97.2%, 97.3% and 97.6% of the sodium chloride. Comparison of these values shows that there is a difference of only about 1 percent from the highest to the lowest value, which illustrates the uniformity of the membrane which is produced by this casting process. The membrane constants of these six membrane samples, (measured in $10^{-5}$ grams per cm.$^2$-sec.-atm.) are 0.90, 0.93, 1.05, 1.09, 1.11 and 1.13. This membrane is considered to be excellently suited for use in a separation application where a high percentage rejection of solute is desired.

Although the invention has been described with reference to certain specific examples and materials, it should be understood that these do not constitute limitations upon the scope of the invention and that modifications which would be obvious to one skilled in the art are considered as coming within the scope defined by the appended claims.

Various of the features of the invention are set forth in the following claims.

What is claimed is:

1. A process for making a nonuniform semipermeable membrane, which process comprises continuously casting a film of a fluid membrane-forming solution cooled to a temperature of about −8° C. upon a moving endless flat smooth surface having a higher temperature, said solution containing cellulose acetate and acetone, evaporating acetone from one surface of said cast film by exposing said surface of said film to a forced circulation of air for about a minute, immersing said film after said evaporation in water at a temperature of about 1° C. to set-up said cast film into a nonuniform semipermeable membrane, and removing said set-up membrane from the endless surface while said membrane is immersed in water.

2. A process for making a nonuniform semipermeable membrane, which process comprises continuously casting a film of a fluid membrane-forming solution containing a cellulose ester, a swelling agent and an organic solvent for said cellulose ester upon a moving endless smooth surface, evaporating the solvent from one surface of said cast film for between about 30 seconds and about 5 minutes, and after said evaporation immersing said film in a water bath at a temperature near its freezing point for a sufficient period to set-up said cast film into a nonuniform semipermeable membrane and removing said film from the endless surface by rolling it onto a drum that is submerged in the water bath.

3. A process for making a nonuniform semipermeable membrane having a thin active surface layer, which process comprises continuously casting a film of a fluid membrane-forming solution containing a cellulose acetate, a swelling agent and an organic solvent for cellulose acetate upon a moving endless smooth surface, evaporating the solvent from one surface of said cast film for between about 30 seconds and about 5 minutes, and after said evaporation immersing said film in a water bath at a temperature near its freezing point for a sufficient period to set-up said cast film into a nonuniform semipermeable membrane and removing said film from the endless surface in a state of slight tension by rolling it onto a drum that is submerged in the water bath.

4. A process for making a nonuniform semipermeable membrane, which process comprises continuously casting a film of a fluid membrane-forming solution containing cellulose acetate, an organic solvent therefor and a swelling agent upon a moving endless smooth surface having a higher temperature than said solution, evaporating said organic solvent from one surface of said cast film by exposing one surface of said film to a forced circulation of gas for about a minute while said film is moving with said surface, and after said evaporation immersing said film in water at a temperature near the freezing point thereof to set-up said cast film into a nonuniform semipermeable membrane and removing said film from the endless surface while immersed in said water.

(References on following page)

References Cited

UNITED STATES PATENTS

| | | | |
|---|---|---|---|
| 1,941,200 | 12/1933 | Chapman | 264—301 |
| 2,200,001 | 5/1940 | Kenyon | 264—212 X |
| 2,371,155 | 3/1945 | Czapek | 264—212 |
| 3,133,132 | 5/1964 | Loeb et al. | 264—49 |

FOREIGN PATENTS 540,530　10/1941　Great Britain.

OTHER REFERENCES

U. S. Office of Saline Water, "Design and Construction of a Desalination Pilot Plant (A Reverse Osmosis Process)," by Aerojet-General Corp., Research and Development Progress Report No. 86, January 1964, pp. 5–7.

JULIUS FROME, *Primary Examiner.*

PHILIP E. ANDERSON, *Assistant Examiner.*

U.S. Cl. X.R.

18—15; 210—500; 264—28, 212, 301